May 1, 1962  A. L. LEWIS ETAL  3,032,236
MEDICAL BANDAGE CONTAINER AND DISPENSER
Filed July 27, 1959
Fig.1
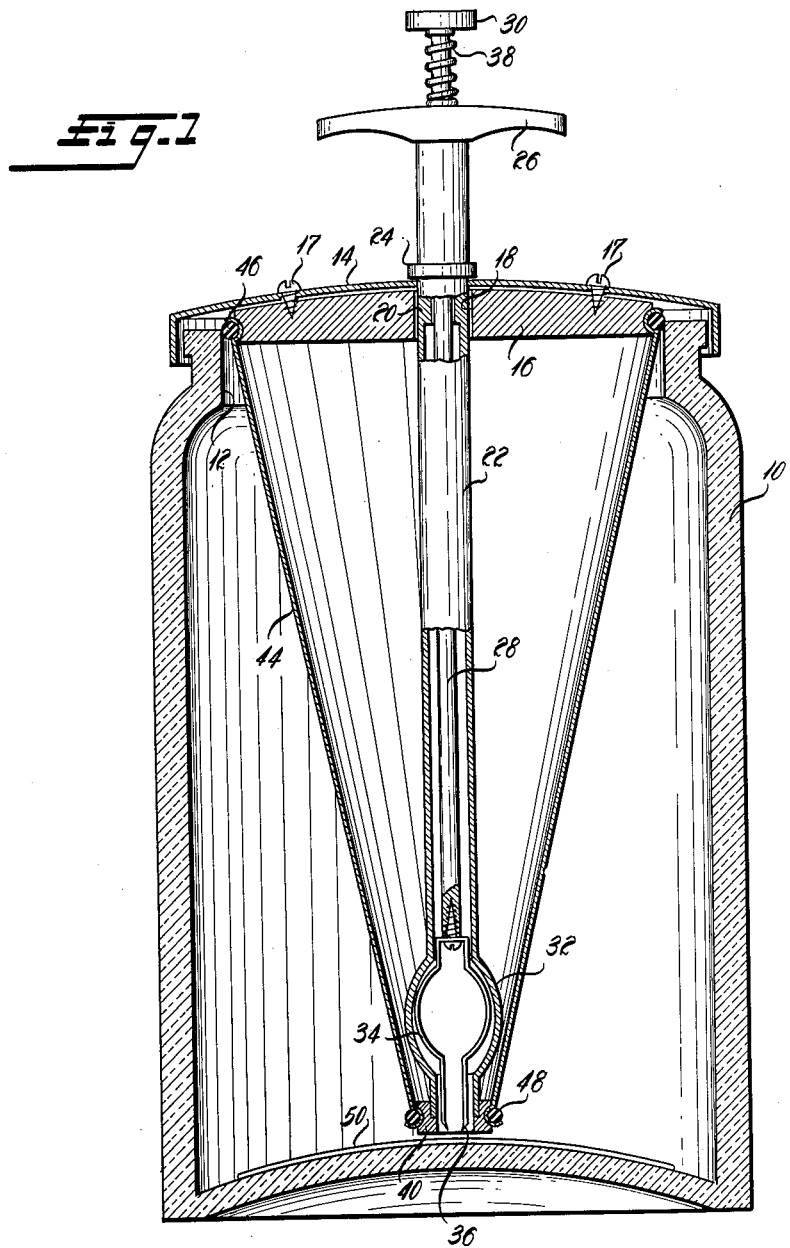
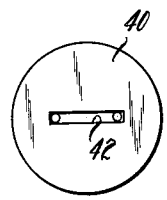
Fig.2
INVENTOR.
BY 3,032,236
MEDICAL BANDAGE CONTAINER
AND DISPENSER
Amos L. Lewis, 428 Glyndon St. NE., Vienna, Va., and
Charles E. Horton, 505 Breckenridge St., Norfolk, Va.
Filed July 27, 1959, Ser. No. 829,724
6 Claims. (Cl. 221—213)

This invention relates to a novel device for storing and dispensing packages of fabric.

More particularly this invention relates to a specially constructed container for the storage and dispensing of sterile gauze bandages while maintaining unused bandages in a sterile condition over an extended period of time.

For the dressing of a wound a physician may use pieces of sterile unmedicated gauze commonly referred to as four by fours and three by threes according to size. Since these bandages may be in direct contact with human tissue it is extremely important that they be sterile and that the storage container and contents remaining be likewise maintained indefinitely in a sterile condition for subsequent use.

Previously it has been customary to store the bandages in a glass jar with a glass or metal top. To remove a bandage it is necessary to remove the jar lid, pick up a pair of sterile forceps, reach into the jar and grasp a bandage therewith, remove it and return the jar lid to its former position. This procedure necessitates either placing the jar lid on a support while removing the bandage or holding the lid in one hand while removing the bandage with the other hand, thus requiring the use of both hands which is very undesirable.

An object of this invention is to provide a container with a readily removable lid unitary with a special forcep for picking up one or more sterile bandages using one hand only.

It is a further object of the invention to provide such a container that will permit a considerable saving in labor and time of the user.

It is a still further object of the invention to provide a container susceptible of less danger of contamination of both removed and stored bandages than by present practice.

Additional objects and advantages will become apparent as the description proceeds in connection with the accompanying drawings in which:

FIGURE 1 is a partial vertical section along the vertical axis of the device; and FIGURE 2 is a bottom end view of the forceps only.

Referring now more particularly to the drawings, the jar 10 which is adapted to contain sterilized bandages has a substantially full width open mouth 12 which is covered by a lid 14 to which a counterweight 16 is attached by any suitable means such as screws 17.

The counterweight 16 and the lid 14 are provided with registering holes 18 and 20, respectively, which are slightly larger than the outer diameter of a plunger housing 22 which is adapted to extend substantially to the bottom of the container 10 when a collar 24 adjustably positioned on the housing 22 rests against the upper surface of the lid 14. The plunger housing 22 also projects a substantial distance above the lid 14 and is provided at its upper end with a handle 26 which may be of any convenient form such as that shown or may comprise a pair of opposed loops. The plunger housing 22 is of hollow construction and slidably receives a plunger 28, the upper end of which projects above the handle 26 of the plunger housing 22 and is provided with an operating knob 30.

At its lower end the plunger housing 22 is flattened to provide a bulbous portion 32 in which a pair of spring steel forcep arms 34 are positioned, the forceps being secured by any suitable means to the lower end of the plunger 28. The lower ends of the forcep arms 34 carry sharp forcep points or jaws 36 which are normally biassed by the arms 34 to the open position as shown in FIGURE 1. The plunger 28 is normally biassed in an upward direction by a coil spring 38, upward movement of the plunger 28 being limited by contact of the spring arms 34 with the walls of the plunger housing 22.

A cap 40 is carried by the lower end of the plunger housing 22 and is provided with a slot 42 to afford a guide for the jaws 36 when the plunger operating button 30 is depressed. The entire plunger assembly is enclosed by a flexible diaphragm of fabric, rubber or similar sheet-like material 44, the upper end of which is secured to the counterweight 16 by a grommet 46 fitting within a groove in the periphery of the counterweight and the lower end of which is carried by a grommet 48 fitting into a suitable groove in the cap 40. If desired, a suitable packing can be provided between the plunger 28 and the plunger housing 22 if a tight seal between these two parts is desired.

The diaphragm 44 provides a dashpot or cushion effect when the plunger housing 28 is raised or lowered through the opening 20. Preferably the counterweight 16 and the grommet 46 are of such dimension that the outside perimeter of the grommet will seat against the inner perimeter of the opening 12 in the mouth of the container 10 to provide a tight seal at this point.

In operation the device is first autoclaved or otherwise sterilized and the container 10 is then filled with sterilized bandages, one of which is indicated at 50. The lid 14 is then placed in its normal position and the weight of the plunger housing 22 will cause its lower end to rest upon the uppermost bandage. When it is desired to remove a bandage from the jar 10 the first and second fingers of one hand of the user are thrust beneath the handle 26 and the plunger housing is gripped between them. The thumb of the same hand then depresses the plunger button 30 causing forcep points 36 to protrude through the slot 42 in cap 40. As the spring arms 36 are moved downwardly, their curved portions engage the lower end of the flattened and bulged portion 32 of the plunger housing thus causing the jaws 36 first to enter the bandage and then to close thus positively grasping and holding the bandage. With the plunger button 30 depressed the entire lid and plunger assembly is then lifted from the container 10 and the bandage moved to the place where it is to be used. Plunger button 30 is then released and the spring 38 raises the forceps which automatically open and retract within the cap 40 thus positively releasing and discharging the bandage.

If desired, the forcep jaws or points 36 may be sufficiently long to pass through more than one bandage so that by gauging the pressure applied to the plunger button 30 one or more bandages may be lifted simultaneously.

From the foregoing, it will be apparent that the above-stated objects and advantages of the invention have been attained by the provision of a device to store and conveniently and rapidly dispense sterile bandages. The invention has substantial practical value since it permits wounds to be dressed rapidly even under unfavorable emergency conditions and surroundings.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A device for dispensing sterile surgical bandages comprising a container for said bandages, a container cover, a hollow housing slidably carried by said cover and extending into said container, grip means supported on said housing for axial sliding movement therein, said grip means being normally positioned in said housing and being movable out of said housing for selectively gripping and removing one or more surgical bandages from said container when said cover is lifted from said container, said grip means comprising spring biased fingers for positively gripping said bandages, and means for simultaneously extending and bringing the ends of said fingers into close proximity.

2. A device for dispensing sterile material comprising a container for said material, a container cover, a tubular housing carried by said cover and extending inwardly of said container to dispose one end of said housing adjacent said sterile material, a plunger mounted for sliding movement in said housing, spring gripping fingers carried by said plunger, said fingers being normally wholly within said housing adjacent said one end thereof, and means providing an opening in said one end of said housing through which said fingers may be extended by displacement of said plunger to grip said sterile material.

3. The device according to claim 2 together with cam means in said housing operable to urge said spring fingers together as they are moved outwardly through said opening.

4. The device according to claim 2 wherein said last-mentioned means comprises a plate adapted to dislodge said material from said fingers when said fingers are withdrawn into said housing.

5. A device for dispensing sterile material comprising a container for said material, a container cover, a tubular housing carried by said cover and extending through said cover inwardly of said container to dispose one end of said housing adjacent said sterile material, a plunger mounted for sliding movement in said housing, spring gripping fingers carried by said plunger, said fingers being normally within said housing adjacent said one end thereof, means providing an opening in said one end of said housing through which said fingers may be extended by displacement of said plunger to grip said sterile material, cam means in said housing operable to urge said spring fingers together as they are moved outwardly through said opening, and a flexible diaphragm extending between said one end of said housing and said container cover whereby contamination of the material in said container is prevented.

6. A device for dispensing sterile material comprising a container for said material, a cover detachably mounted on said container, a tubular housing slidably carried by said cover and extending through said cover inwardly of said container to dispose one end of said housing adjacent said sterile material and the other end of said housing outwardly of said cover, a plunger mounted for sliding movement in said housing and having an operating handle at one end outwardly of said cover, spring gripping fingers carried by the opposite end of said plunger, said fingers being normally within said housing adjacent said other end thereof, means providing an opening in said other end of said housing through which said fingers may be extended by displacement of said plunger by operation of said handle to grip said sterile material, and means in said housing operable to urge said spring fingers together as they are moved outwardly through said opening to cause said fingers to grip said material and to thereafter strip material from said fingers when they are returned to a position within said housing.

References Cited in the file of this patent
UNITED STATES PATENTS

| | | |
|---|---|---|
| 204,930 | White | June 18, 1878 |
| 359,653 | Wettstein | Mar. 22, 1887 |
| 592,499 | Stephens | Oct. 26, 1897 |
| 1,145,947 | Vandiver | July 13, 1915 |
| 2,443,520 | Schwartz et al. | June 15, 1948 |